Oct. 28, 1952 K. C. DE GROFF 2,615,379
FLUID OPERABLE SHUTTER RELEASE
Filed Oct. 29, 1949
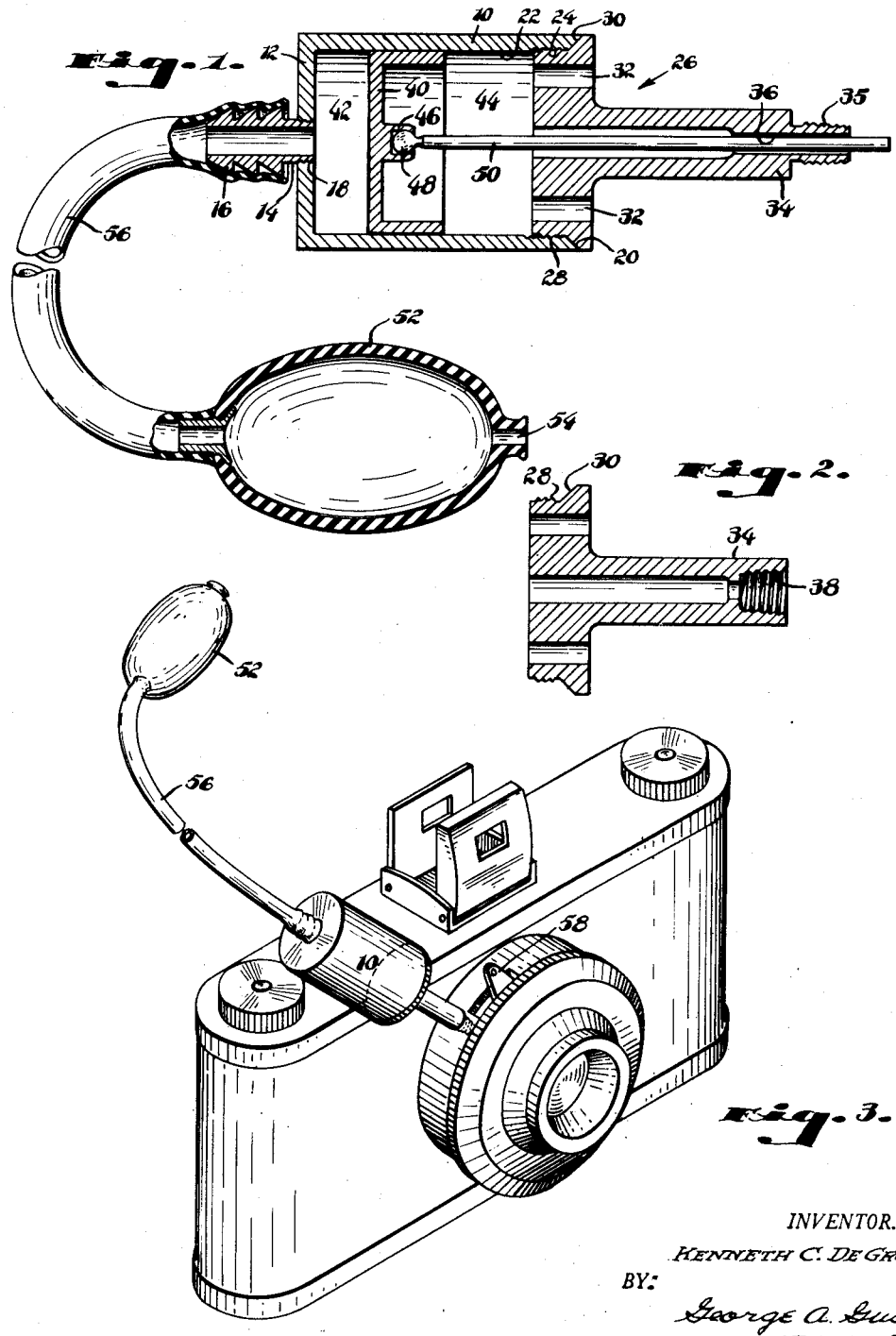
INVENTOR.
KENNETH C. DE GROFF,
BY:
George A. Gust,
ATTORNEY.

Patented Oct. 28, 1952

2,615,379

UNITED STATES PATENT OFFICE 2,615,379

FLUID OPERABLE SHUTTER RELEASE

Kenneth C. De Groff, South Bend, Ind.

Application October 29, 1949, Serial No. 124,392

1 Claim. (Cl. 95—54)

The present invention relates to cameras and more particularly to a fluid operable release device for operating the shutter of a camera, said device facilitating control of the shutter from a point remote from the camera.

The primary object of this invention is to provide a positively responsive fluid release which may be used with almost any type of camera, especially those having non-self-cocking shutters. A self-cocking shutter is one in which the shutter is cocked and tripped in a single motion of the shutter lever, while a non-self-cocking shutter is one in which the shutter is only tripped by movement of said lever. One principal difference in the design characteristics of the two is that in the former type, a relatively strong spring member is utilized to return the shutter to released position after the cocking-tripping cycle. The latter type is actually cocked by a part of the camera mechanism in moving unexposed film into exposing position, or some other operation on the camera preparatory to taking another picture. Experience has proven that when a conventional shutter release is used with the non-self-cocking shutter, the frictional load operatively exerted on the shutter by the release will sometimes prevent cocking. The present invention obviates this problem because the actuator acts both in protractile and retractile directions.

Another object of the invention is to provide a fluid operable shutter release which is simple in design, economical to manufacture, and reliable in operation. Simplicity is attained by using a minimum of parts. Economy and reliability are achieved by the particular design features described hereinafter.

It has been found that the actuating pin in a shutter release must be held against more than very slight lateral movement but must be readily movable in an axial direction. In the past to achieve this functional requirement manufacturing tolerances had to be held extremely close. In the present invention, this requirement has been substantially eliminated, thereby permitting the use of ordinary manufacturing procedures.

Some other advantages realized with this invention are (a) positive control of the shutter when opened for a time exposure, (b) elimination of any rigid or semi-rigid connections between operator and camera through which the camera may be jarred, (c) universal application to almost all cameras manufactured today, and (d) substantially unlimited range of remote control (it being found in practice that cable releases have an effective operating length of about ten feet).

Other objects and objects ancillary thereto will become apparent as the description proceeds.

In the drawings,

Figure 1 is a sectional view of the actuator of the present invention;

Figure 2 is a sectional view of a modified form of closure member; and

Figure 3 is a view of the actuator of Figure 1 in combination with a camera shutter.

Referring to the drawings and more particularly to Figure 1, a housing, or cylinder 10 is provided in one end 12 with a control port fitting 14 having spaced annular serrations 16. Fitting 14 may be of any conventional design and is secured in end 12 by any suitable means such as the screw threads 18. The other end of cylinder 10 is open and is preferably provided with an inwardly tapered centering bevel 20 concentric with the cylinder bore 22. Threads 24 are cut in bore 22 to the rear of bevel 20. While any suitable material may be used, it has been found that a relatively light weight material, such as aluminum, works very satisfactorily.

Fitted in the open end of cylinder 10 is a closure member 26 having its outer periphery machined with threads 28 and a bevel 30 received in threads 24 and bevel 20, respectively. Vents 32 of relatively large size are provided to permit the exhaust and intake of air through closure member 26.

An axially extending concentric projection 34 is formed with a co-axial guide opening or bore 36 for a purpose which will hereafter become apparent. As shown in Figure 1, the end of projection 34 remote from the housing 10 is threaded as at 35 for reception in a camera shutter assembly as illustrated in Figure 3. Since some camera shutter assemblies are equipped with male threaded projections, it is desirable to provide an alternative embodiment including female threads 38 in projection 34 as illustrated in Figure 2.

Reciprocably received in cylinder bore 22 is a fluid pressure-responsive member, or piston 40 defining separate variable volume chambers 42 and 44, and having a centrally projecting, axially centered socket 46 which receives a ball 48 formed on the end of pin 50 in such a manner as to provide a loose wobble connection. Pin 50 extends to the right through guide opening 36, the diameters of pin 50 and opening 36 being of substantially the same size to limit the lateral motion of pin 50 to a minimum. Piston 40 is preferably machined with sharp lateral edges which tend to wipe the cylinder walls clean with each motion thereof.

As illustrated in the drawings, the projection 34 is of relatively small diameter as compared to the diameter of housing 10. Also, it is of relatively long length. The reason for these particular design features is that in adapting the actuator for use with modern cameras, it was necessary to space the housing 10 a sufficient distance from the shutter assembly so that its circumference would clear the camera casing. With the housing 10 thus clearing the camera casing or other camera obstructions, it could be made the requisite diameter to accommodate a piston 40 having sufficient area to actuate the shutter at the pressures developed by the bulb 52.

The distance from piston 40 to the outer end of projection 34 therefore being relatively great, and the diameter of projection 34 being relatively small, the wall thickness surrounding bore 36 is obviously limited, requiring that bore 36 be substantially concentric with the projection 34. It is thus seen that if pin 50 were rigidly, eccentrically fastened to piston 40, in the manner of prior art designs, such eccentricity would require the bore 36 to be eccentric with respect to the projection 34, thereby reducing its wall thickness in certain portions thereof, and would also interfere with the satisfactory operation of the actuator because of the tendency of piston 40 to stick. With the design of this invention in which a loose push-pull connection between piston and pin is utilized, the bore 36 can be made substantially concentric with respect to projection 34, thereby providing a sufficient wall thickness which may be threaded as at 35. Also the effects of any eccentricities between piston 40 and pin 50 will be substantially eliminated to allow for facile movement of all parts. To guard against excessive lateral deflection of pin 50 and consequent tilting of piston 40, the bore 36 is formed to decimal size. Lateral loads exerted by the shutter mechanism on pin 50 are thereby prevented from causing such excessive deflection.

The invention may be operated by means of a rubber bulb 52 having an aperture 54 which may be covered by the thumb of the operator, and a rubber hose 56 connectible on fitting 14 of cylinder 10. By placing the thumb over aperture 54, the bulb 52 may be squeezed to produce a pressure in tube 56 and chamber 42, thereby forcing piston 40 to the right. This motion is transmitted to pin 50 causing it to protrude from the end of projection 34 as illustrated. If the thumb is maintained over aperture 54 and the bulb 52 allowed to distend to its normal volume, the pressure in chamber 42 will be reduced thereby causing piston 40 and pin 50 to move to the left until the piston engages end 12 of cylinder 10. Thus the position of pin 50 is positively controlled by the operator to enable complete regulation of the camera shutter. The tripping mechanism associated with the shutter which is engaged by the protruding trip pin is the same as that engaged by the conventional cable release.

It is possible, with camera shutters of the self-cocking type, to use a floating trip pin since the spring member in the shutter will retract this pin after a shutter cock-trip cycle. However, in the non-self-cocking type, the trip pin is not retracted by any shutter structure whereupon the pin interferes with the shutter cocking mechanism. In order to cock the shutter, the pin must first be manually retracted. The tension connection between the piston 40 and pin 50 obviates this difficulty, whereby the present invention becomes universally adaptable to cameras having either type of shutter.

Figure 3 illustrates a typical camera shutter assembly, which may be of either the self-cocking or non-self-cocking type, with the actuator of the present invention secured in place. The lever 58 constitutes the manual shutter release. If it is desired to operate the camera from a remote point, the bulb 52 is manipulated as explained previously.

Actuators of the pneumatic type used prior to this invention were generally of two types. One type was used in conjunction with a non-cocking shutter and positively controlled its opening and closing. The other type was successfully used with the self-cocking type of shutter but not with the non-self-cocking type. This invention, as explained previously, is suited to any type of shutter, and the particular embodiment disclosed is particularly adaptable to almost all commercial shutter assemblies on the market today.

While the illustrations and foregoing description of the invention have been directed to only two embodiments, certain changes and modifications may be made therein without departing from the scope of the invention. The appended claim is intended to cover such changes and modifications.

I claim as my invention:

For use in combination with a camera shutter, a pneumatic shutter release comprising a casing having a cylindrical bore, a piston movable under the influence of differential air pressure and reciprocably received in said bore, said piston having an axial length of sufficient dimension to overcome the tendency of said piston to tilt and become wedged against movement in said bore, the ends of said piston near its outer peripheral surface merging with said peripheral surface in sharp right angle corners whereby reciprocatory motion of said piston cleans foreign matter from the surface of said bore, a guide member secured at one end of said bore and having a relatively long projection extending away from said bore, said projection having a guide opening substantially coaxial with said bore, an actuating pin guided in said guide opening against lateral motion and for reciprocatory movement, said pin having one end extending out of the end of said projection and adapted to engage the tripping mechanism of the camera shutter, and the other end provided with a ball, said piston being cup-shaped with the open end thereof facing said guide member and having a boss extending from the bottom thereof into a location which is midway between the ends of said piston, and a socket which is substantially centered axially and radially with respect to said piston being provided in said boss and loosely receiving said ball, said socket having its outer end reduced in size so as to engage loosely said ball whereby said pin will have universal swivelling movement with respect to said piston and will reciprocate in accordance with reciprocatory movement of said piston.

KENNETH C. DE GROFF.

REFERENCES CITED

The following references are of record in the file of this patent:

UNITED STATES PATENTS

| Number | Name | Date |
| --- | --- | --- |
| 399,789 | Scott | Mar. 19, 1889 |
| 624,693 | Sheffield | May 9, 1899 |
| 1,102,278 | Lipp | July 7, 1914 |
| 1,835,902 | Rommel | Dec. 8, 1931 |
| 1,858,691 | Stroecker | May 17, 1932 |
| 2,152,022 | Boetto | Mar. 28, 1939 |
| 2,558,235 | Castellano | June 26, 1951 |

FOREIGN PATENTS

| Number | Country | Date |
| --- | --- | --- |
| 24,296 | Germany | Nov. 9, 1883 |